(12) United States Patent
Tan (10) Patent No.: US 10,866,453 B2
(45) Date of Patent: Dec. 15, 2020

(54) DISPLAY PANEL AND METHOD FOR FABRICATING THE SAME, DISPLAY DEVICE AND DISPLAY METHOD

(71) Applicant: BOE TECHNOLOGY GROUP CO., LTD., Beijing (CN)

(72) Inventor: Jifeng Tan, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 8 days.

(21) Appl. No.: 16/239,727

(22) Filed: Jan. 4, 2019

(65) Prior Publication Data
US 2019/0285935 A1    Sep. 19, 2019

(30) Foreign Application Priority Data

Mar. 15, 2018 (CN) .......................... 2018 1 0214907

(51) Int. Cl.
*G02F 1/1335* (2006.01)
(52) U.S. Cl.
CPC .. *G02F 1/133524* (2013.01); *G02F 1/133514* (2013.01); *G02F 1/133526* (2013.01)
(58) Field of Classification Search
CPC ......... G02F 1/133524; G02F 1/133514; G02F 1/133526
USPC ............................................. 349/95, 110–111
See application file for complete search history.

(56) References Cited

U.S. PATENT DOCUMENTS

| | | | | |
|---|---|---|---|---|
| 2006/0181901 A1* | 8/2006 | Sakai | ................... | G02B 6/0051 362/613 |
| 2008/0084517 A1* | 4/2008 | Itou | ................... | G02F 1/133514 349/62 |
| 2016/0085118 A1* | 3/2016 | Lee | ................... | G02F 1/133512 349/62 |

FOREIGN PATENT DOCUMENTS

| | | |
|---|---|---|
| CN | 104730763 A | 6/2015 |
| CN | 106526942 A | 3/2017 |
| CN | 107238974 A | 10/2017 |
| CN | 107450211 A | 12/2017 |
| CN | 107621729 A | 1/2018 |

OTHER PUBLICATIONS

First Office Action dated Jul. 1, 2020, for corresponding Chinese application No. 201810214907.6.

\* cited by examiner

*Primary Examiner* — Charles S Chang
(74) *Attorney, Agent, or Firm* — Nath, Goldberg & Meyer; Joshua B. Goldberg; Stephanie F. Majkut (57) ABSTRACT

A display panel, a method for fabricating a display panel, a display device and a display method are provided. In an embodiment, the light extraction element extracts light from the light guide plate. The extracted light travels substantially to the liquid crystal layer in a direction perpendicular to the light guide plate. An orthographic projection of the light blocking portion of each pixel region on the first surface covers an orthographic projection of the light extraction element corresponding to the pixel region on the first surface. With the refraction of the liquid crystal lens formed by the liquid crystal layer, the extracted light may be blocked by the light blocking portion or may be emitted from a first light transmitting portion. Thereby, an image display is realized by means of the refraction of the liquid crystal lens (Continued)

without providing a polarizer, improving light utilization efficiency of the display device.

20 Claims, 7 Drawing Sheets

DISPLAY PANEL AND METHOD FOR FABRICATING THE SAME, DISPLAY DEVICE AND DISPLAY METHOD

CROSS-REFERENCE TO RELATED APPLICATION

The present application claims priority of Chinese Patent Application No. 201810214907.6, filed on Mar. 15, 2018, the disclosure of which is hereby incorporated by reference in its entirety.

TECHNICAL FIELD

The present disclosure relates to the field of touch technologies, and in particular, to a display panel, a method for fabricating a display panel, a display device and a display method.

BACKGROUND

A liquid crystal display (LCD) device has become a mainstream product in flat panel display devices due to its characters such as small size, low power consumption, and no radiation. The liquid crystal display panel is a key component in the liquid crystal display device. The liquid crystal display panel includes an array substrate and a color filter substrate which are aligned and assembled into a cell, and a liquid crystal layer is provided between the array substrate and the color filter substrate.

SUMMARY

Embodiments of the present disclosure provide a display panel, a method for fabricating a display panel, a display device and a display method.

An embodiment of the present disclosure provides a display panel including: a light guide plate; a plurality of liquid crystal lenses provided in a single layer; a light control layer provided in a stacked manner with the light guide plate and the plurality of liquid crystal lenses, wherein the plurality of liquid crystal lenses are provided between the light guide plate and the light control layer; a plurality of light extraction elements provided on a first surface of the light guide plate facing the light control layer or a second surface of the light guide plate facing away from the light control layer, an initial light beam extracted by each light extraction element is transmitted toward the light control layer and is substantially perpendicular to the light control layer, and the plurality of liquid crystal lenses are in one-to-one correspondence with the plurality of light extraction elements; wherein the light control layer includes a plurality of pixel regions, each of the pixel regions including at least a light blocking portion and a first light transmitting portion directly adjacent to the light blocking portion; an orthographic projection of the light blocking portion of each of the pixel regions on the first surface of the light guide plate covers an orthographic projection of the light extraction element corresponding to the pixel region on the first surface of the light guide plate.

In some implementations, the liquid crystal lens includes a first electrode, a second electrode and a liquid crystal layer, wherein the first electrode and the second electrode are provided above the plurality of light extraction elements, and the liquid crystal layer is provided above the first electrode and second electrode.

In some implementations, the display panel is a liquid crystal display panel, and the first electrode is a pixel electrode and the second electrode is a common electrode.

In some implementations, the light extraction element is an echelon grating or a blazed grating.

In some implementations, the display panel further includes a filling layer covering the plurality of light extraction elements.

In some implementations, the filling layer has a refractive index lower than a refractive index of the light guide plate.

In some implementations, at least one side of the light guide plate is provided with a light source and a reflector, the reflector including at least a reflective curved surface for redirecting light emitted by the light source to a light incident surface of the light guide plate; a distance between a light emitting surface of the light source and a plane in which the first surface being located in a direction perpendicular to the first surface ranges from 2 mm to 6 mm.

In some implementations, both sides of the light guide plate are provided with a light source and a reflector respectively, each reflector including a reflective curved surface and a reflective flat surface.

In some implementations, the reflective plane has a width ranging from 1 mm to 4 mm, a distance between a light emitting surface of the light source and a plane in which the first surface is located in a direction perpendicular to the first surface ranges from 2 mm to 4 mm.

In some implementations, each of the pixel regions includes a filter, an orthographic projection of the filter on the light guide plate overlapping with an orthographic projection of the first light transmitting portion on the light guide plate.

In some implementations, the filter includes at least three sub-filters of different colors.

In some implementations, the material of the filter is a quantum dot.

In some implementations, in each of the pixel regions, the light blocking portion includes at least one strip-shaped light blocking element.

In some implementations, each of the pixel regions further includes a second light transmitting portion; in each of the pixel regions, a sum of an area of the light blocking portion and an area of the first light transmitting portion is equal to or smaller than an area of the second light transmitting portion.

An embodiment of the present disclosure provides a display device including the above display panel.

An embodiment of the present disclosure provides display method of the above display panel, including: deflecting, by the plurality of liquid crystal lenses, light beams from the plurality of light extraction elements in accordance with an image to be displayed, so as to adjust a ratio of light blocked by the light blocking portion in each of the pixel regions.

In some implementations, the liquid crystal lens includes a first electrode, a second electrode, and a liquid crystal layer provided between the first electrode and the second electrode, the method further including: applying a voltage across the first electrode and the second electrode to generate an electric field therebetween, liquid crystal molecules of the liquid crystal layer deflect under an action of the electric field, thus a refractive index of the liquid crystal layer is changed, so that light beam passing therethrough is deflected.

In some implementations, each of the pixel regions includes a filter, an orthographic projection of the filter on the light guide plate overlapping with that of the first light transmitting portion on the light guide plate, the method further including: transmitting, by the filter, the deflected light beam.

In some implementations, each of the pixel regions further includes a second light transmitting portion; in each of the pixel regions, a sum of an area of the light blocking portion and an area of the first light transmitting portion is equal to or smaller than an area of the second light transmitting portion, the method further including: transmitting, by the second light transmitting portion, an ambient light.

An embodiment of the present disclosure provides a method for fabricating the display substrate described above, including: providing a light guide plate and a light control layer opposite to the light guide plate; providing a plurality of light extraction elements on a first surface of the light guide plate facing the light control layer or a second surface of the light guide plate facing away from the light control layer; providing a plurality of liquid crystal lenses between the light guide plate and the light control layer; wherein the light control layer on a side of the liquid crystal layer away from the light guide plate, an initial light beam extracted by each light extraction element is transmitted toward the light control layer and is substantially perpendicular to the light control layer, and the plurality of liquid crystal lenses are in one-to-one correspondence with the plurality of light extraction elements; the light control layer includes a plurality of pixel regions, each of the pixel regions including at least a light blocking portion and a first light transmitting portion directly adjacent to the light blocking portion; an orthographic projection of the light blocking portion of each of the pixel regions on the first surface of the light guide plate completely covers an orthographic projection of the light extraction element corresponding to the pixel region on the first surface of the light guide plate

BRIEF DESCRIPTION OF THE DRAWINGS

In order to more clearly illustrate the embodiments of the present disclosure or the technical solutions in the prior art, the drawings used in the embodiments or the description of the prior art will be briefly described below, and obviously, in the following description, the drawings are only some of the embodiments of the present disclosure, and those of ordinary skill in the art may obtain other drawings based on these drawings without creative labor.

FIG. 2 is a plan view of a light control layer in the embodiment shown in FIG. 1a;

DETAILED DESCRIPTION

The technical solutions in the embodiments of the present disclosure will be clearly and completely described in the following with reference to the accompanying drawings in the embodiments of the present disclosure. It is obvious that the described embodiments are only a portion of the embodiments of the present disclosure, rather than all of the embodiments. All other embodiments obtained by a person of ordinary skill in the art based on the embodiments of the present disclosure without creative labor will fall within the protection scope of the present disclosure.

Figure 1A:
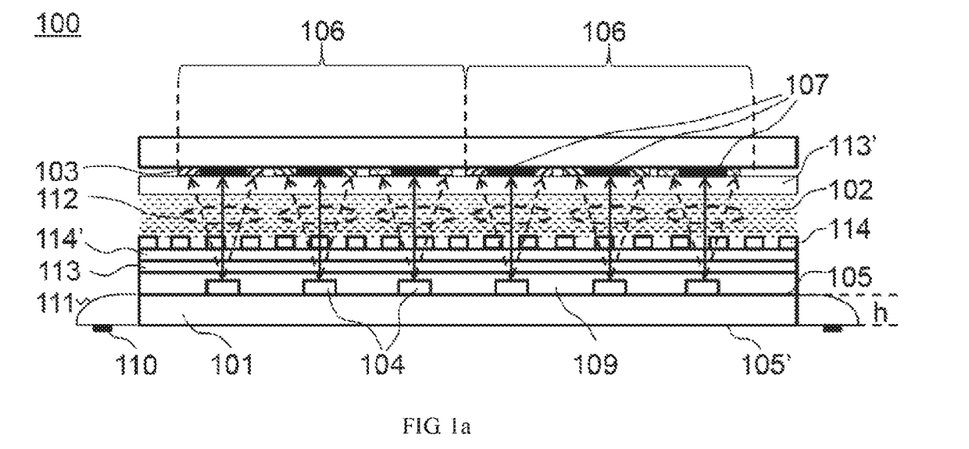
FIG. 1a is a schematic structural view of a display panel according to an embodiment of the present disclosure.
Figure 2:
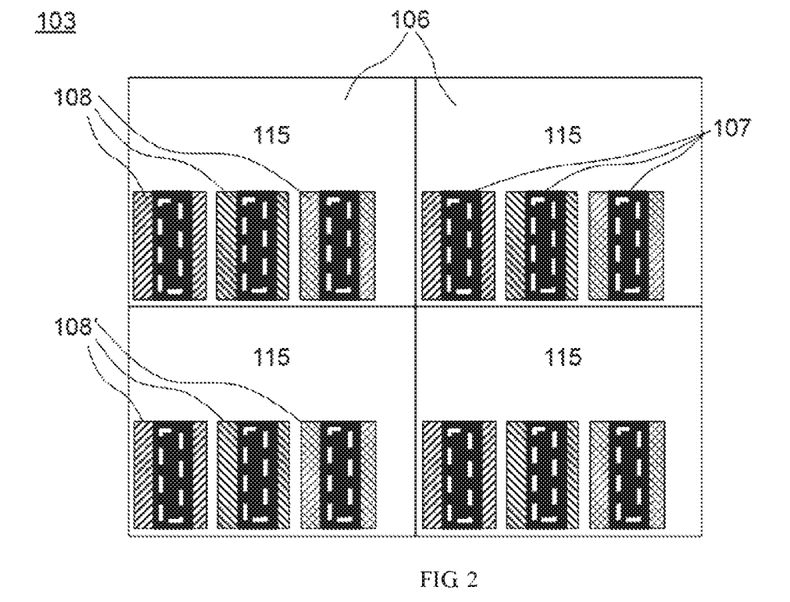

According to an aspect of the disclosure, a display panel is provided. As shown in FIG. 1a and FIG. 2, the display panel 100 includes a light guide plate 101, a plurality of liquid crystal lenses 112 and a light control layer 103 which are arranged in a stacked manner. The plurality of liquid crystal lenses 112 are provided between the light guide plate 101 and the light control layer 103. A plurality of light extraction elements 104 are provided at a first surface 105 of the light guide plate 101 facing the light control layer 103 or at a second surface 105' of the light guide plate 101 facing away from the light control layer 103. Initial light beam extracted by each light extraction element 104 (shown by the solid arrow in FIG. 1a) is transmitted toward the light control layer 103 and is substantially perpendicular to the light control layer 103, where the term "substantially perpendicular to" means that the initial beam extracted by the light extraction element 104 becomes a collimated light so as to be approximately perpendicular to the light control layer 103 as much as possible, although it cannot be completely perpendicular to the light control layer 103 due to some limitations, an angle of deviation of the light beam can be limited within a certain range. For example, in the embodiment of the present disclosure, as long as when a dark state is displayed, the initial beam extracted by the light extraction element 104 can be blocked by a light blocking portion described below without leaking from a first light transmitting portion described below, it can be considered that the initial light beam extracted by the light extraction element 104 is substantially perpendicular to the light control layer 103. The plurality of liquid crystal lenses 112 correspond to the plurality of light extraction elements 104 in a one-to-one manner. The light control layer 103 includes a plurality of pixel regions 106, each of the pixel regions 106 includes at least a light blocking portion 107 and a first light transmitting portion 108 directly adjacent to the light blocking portion 107. An orthographic projection of the light blocking portion 107 of each of the pixel regions 106 on the first surface 105 of the light guide plate completely covers an orthographic projection of the light extraction element 104 corresponding to the pixel region 106 on the first surface 105 of the light guide plate.

In an embodiment of the present disclosure, the light extraction element 104 extracts light from the light guide plate 101, the extracted light is transmitted toward the liquid crystal layer 102 in a direction substantially perpendicularly to the light guide plate 101. The orthographic projection of the light blocking portion 107 of each pixel region 106 on the first surface 105 completely covers the orthographic projection of the light extraction element 104 corresponding to the pixel region 106 on the first surface 105. With the liquid crystal lens 112, the light extracted by the light extraction element 104 can be blocked by the light blocking portion 107 (as indicated by the solid arrow in FIG. 1a) or emitted from the first light transmitting portion 108 (as indicated by the dashed arrow in FIG. 1a). In other words, the liquid crystal lens 112 can cause the extracted light to be approximately collimated and emitted toward the light blocking portion 107, so that extracted light is blocked by the light blocking portion 107 to display a dark state, alternatively, the liquid crystal lens 112 can cause the extracted light to be refracted to be emitted from the first light transmitting portion 108 to display an image. Thereby, an image is displayed by the refraction of the liquid crystal lens without providing a polarizer. In the liquid crystal display panel of the related art, two polarizers are used, which is not only costly, but also has a low light transmittance after the incident light passes through the two polarizers. In contrast, the display panel in the embodiment of the present disclosure can increase the light transmittance greatly due to omitting the two polarizers.

The plurality of light extraction elements 104 may be provided on the first surface 105 of the light guide plate 101 facing the light control layer 103 or the second surface 105' of the light guide plate 101 facing away from the light control layer 103. In a case where the plurality of light extraction elements 104 are provided on the first surface 105, the light extraction elements 104 may be, for example, transmissive gratings. In a case where the plurality of light extraction elements 104 are provided on the second surface 105', the light extraction elements 104 may be, for example, reflective gratings.

Figure 1B:
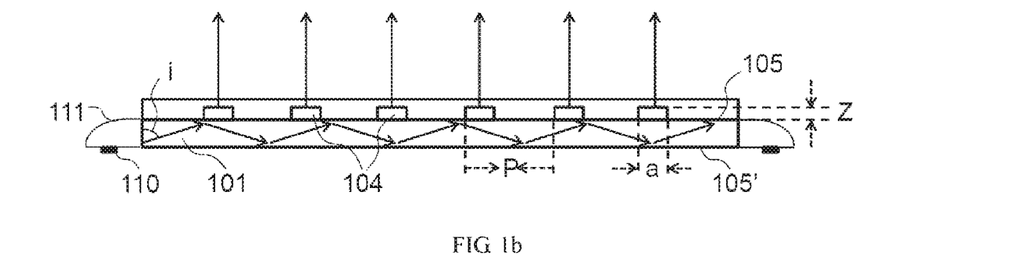
FIG. 1b is a schematic structural view of a grating according to an embodiment of the present disclosure.

In an example, to obtain a light beam emitted vertically upwards, corresponding grating parameters (e.g., period P of grating, line width a of grating, and height Z of grating) can be calculated from a grating equation. As shown in FIG. 1b, an incident angle i of incident light is, for example, 65±5°, and a center wavelength of the incident light is about 525 nm. In this example, the period P of grating is 381 nm, the line width a of grating is 228.6 nm, and the height Z of grating is 350 nm.

Although only four pixel regions 106 are shown in FIG. 2, those skilled in the art will appreciate that a display device in accordance with embodiments of the present disclosure may include any number of pixel regions 106. Spaces among the plurality of first light transmitting portions 108 in a same pixel region 106 may be filled by using, for example, a black matrix or a strip-shaped light blocking element, thereby avoiding light leakage and improving display contrast.

Figure 3:
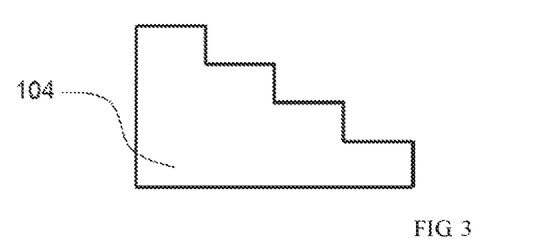
FIG. 3 is a diagram illustrating a partial structure of a touch substrate according to another embodiment of the present disclosure.
Figure 4:
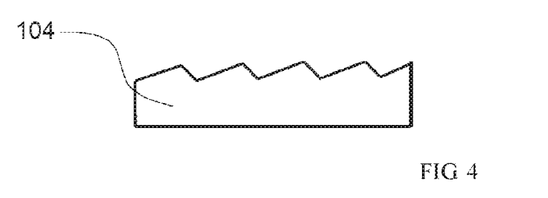
FIG. 4 is a flowchart of a method for fabricating a touch substrate according to an embodiment of the present disclosure.
Figure 5A:
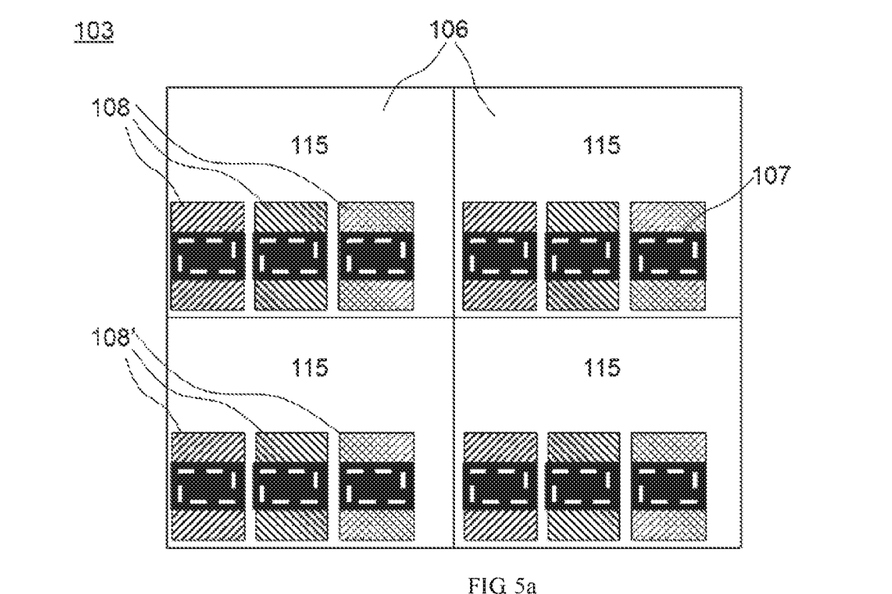
FIGS. 5a to 5e are schematic structural diagrams of a display panel according to an embodiment of the present disclosure.
Figure 5B:
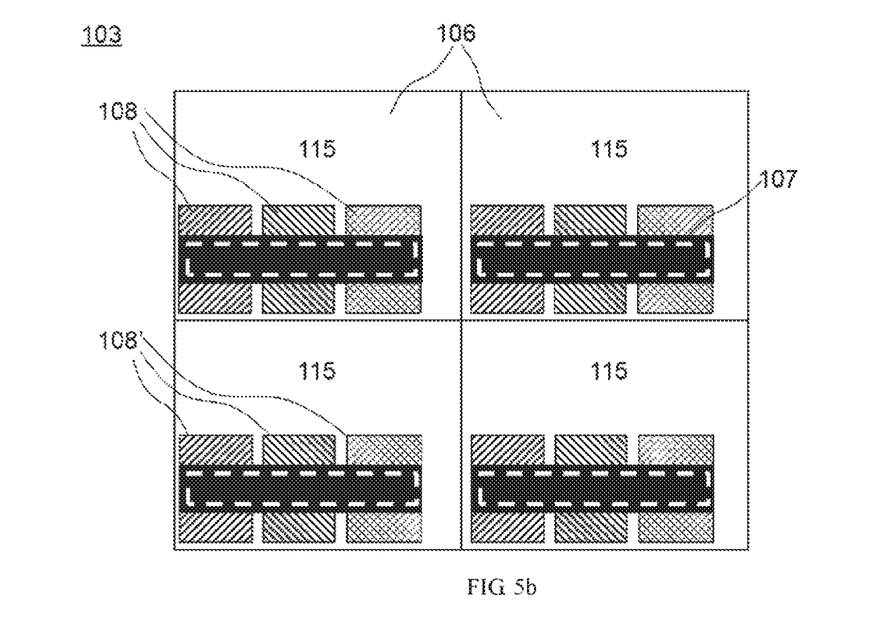
Figure 5C:
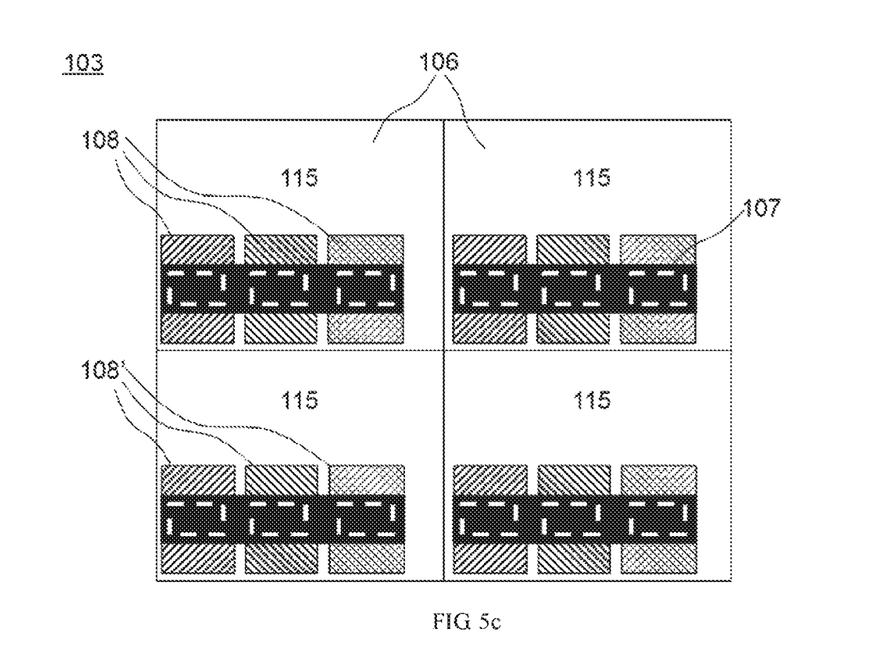
Figure 5D:
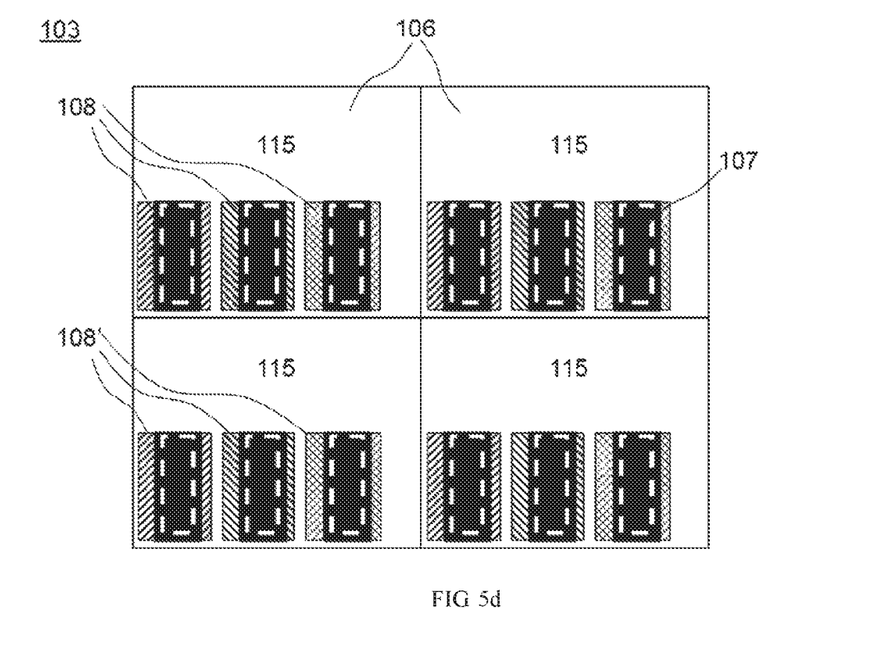
Figure 5E:
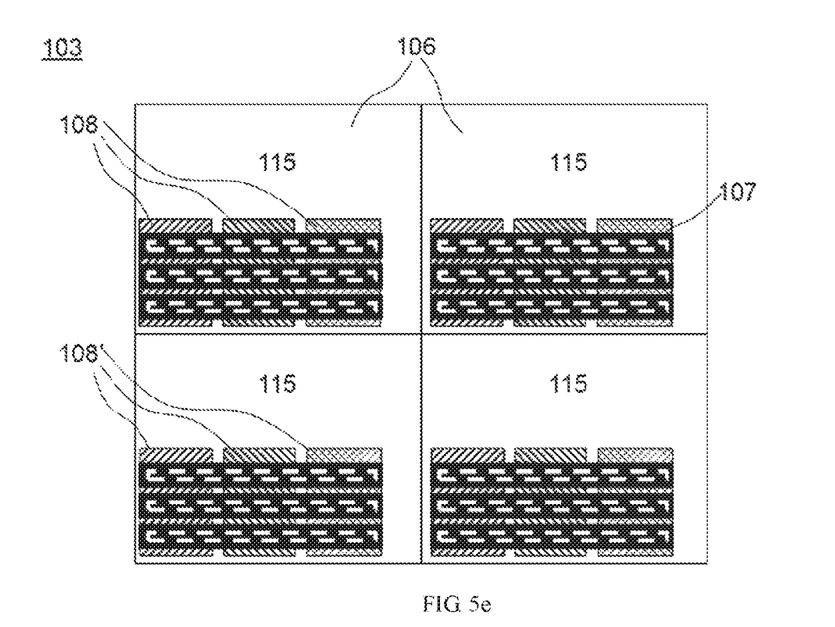

In some embodiments, the light extraction element 104 is an echelon grating (as shown in FIG. 3) or a blazed grating (as shown in FIG. 4).

With the echelon grating or the blazed grating, the light extraction efficiency can be further improved, thereby further improving the light utilization efficiency of the display device.

In some embodiments, as shown in FIG. 1a, the display panel 100 further includes a filling layer 109 covering the plurality of light extraction elements 104.

The first surface may be planarized by providing the filling layer, which not only facilitates the extraction of light, but also facilitates bonding of other layers.

In some embodiments, the filling layer 109 has a refractive index lower than a refractive index of the light guide plate 101.

In a case where the refractive index of the filling layer is smaller than the refractive index of the light guide plate, more light may be emitted through the light extraction element, thereby further improving light extraction efficiency.

Figure 1C:
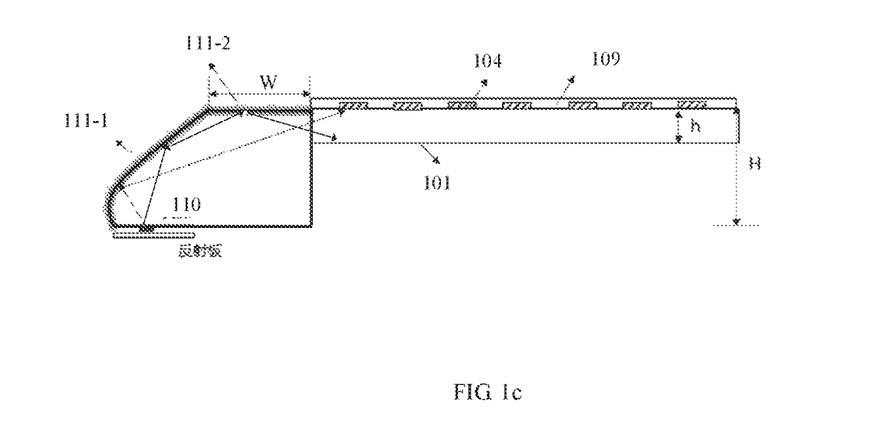
FIG. 1c is a schematic structural diagram of a display panel according to an embodiment of the present disclosure.

In some embodiments, as shown in FIG. 1a and FIG. 1b, each of sides of the light guide plate is provided with a light source 110 and a reflector 111, the reflector 111 at least includes a reflective curved surface 111-1 and a reflective plane 111-2, as shown in FIG. 1c. The reflective curved surface 111-1 and the reflective plane 111-2 are configured to reflect the light emitted by the light source 110 to redirect the light emitted by the light source 110 to a light incident surface of the light guide plate 101. In some embodiments, the light emitting surface of the light source 110 is planar and parallel to the first surface 105 of the light guide plate, and a distance H between the light emitting surface of the light source 110 and a plane in which the first surface 105 is located in a direction perpendicular to the first surface ranges from 2 mm to 6 mm. In addition, in some embodiments, the distance H between the light emitting surface of the light source 110 and the plane in which the first surface 105 is located in a direction perpendicular to the first surface ranges from 2 mm to 4 mm. In some embodiments, the light guide plate has a thickness ranging from 0.1 mm to 1.2 mm.

In some embodiments, a width W of the reflective plane 111-2 shown in FIG. 1c ranges from 1 mm to 4 mm. In some embodiments, the width W of the reflective plane 111-2 shown in FIG. 1c is 2.5 mm.

In some embodiments, the light guide plate used has a thickness of about 0.7 mm. The light source has a light emitting direction that is substantially the same as a direction of propagation of the initial light beam. With the above arrangement, the overall thickness and volume of the display device are reduced. Also, more light emitted by the light source can enter the light guide plate, thereby increasing the brightness and contrast of the display device.

As shown in FIG. 1a, the liquid crystal lens 112 may be formed of, for example, electrodes 114, 114' provided on the base substrate 113 and liquid crystal molecules in the liquid crystal layer 102. The electrodes 114, 114' for driving the liquid crystal molecules and switching elements may also be formed on a base substrate 113' opposite to the base substrate 113. Similarly, the electrodes 114, 114' for driving the liquid crystal molecules may be respectively provided on the two base substrates 113 and 113' between which the liquid crystal layer 102 is provided. For example, the electrode 114 may be a strip-shaped electrode or a comb-shaped electrode, and the electrode 114' may be a planar electrode. Conventional nano-imprint lithography process can only produce samples of 8 inches or less, and it is difficult to arrange the switch array after the nano-imprint lithography process is completed, so an AOC structure (i.e., Array on CF) can be adopted. In some embodiments, the electrode 114 may be a pixel electrode and the electrode 114' may be a common electrode.

With the liquid crystal lens 112, it is possible to flexibly deflect the light beam in the liquid crystal layer, so that the light beam traveling toward the light blocking portion 107 can be emitted from the first light transmitting portion 108. Those skilled in the art can understand that a manner in which the liquid crystal lens corresponds to the light extraction element means that an orthographic projection of the liquid crystal lens on the light guide plate and an orthographic projection of the light extraction element on the light guide plate may be completely overlapped or partially overlapped. The liquid crystal lens may be equivalent to a convex lens, a concave lens, or a prism.

In some embodiments, as shown in FIG. 2, each pixel region 106 includes a filter 108', an orthographic projection of the filter 108' on the light guide plate overlaps with that of the first light transmitting portion 108 on the light guide plate.

In some embodiments, as shown in FIG. 2, the filter 108' includes at least three sub-filters of different colors.

With the above-described filter, a color display can be realized.

The filter 108' is made of a quantum dot material.

The light source may be a monochromatic short-wavelength light source, thereby exciting the RGB quantum dot to achieve a color display. In some embodiments, the light source may adopt an OLED or a micro led or the like, a half-peak width of a light-emitting spectrum of which may be less than 20 nm and a size of which may be 200 µm×200 µm. In addition, light sources may be provided symmetrically on both sides of the light guide plate. In an embodiment of the present disclosure, light extracted by the light extraction element has a certain directivity, so it is required to be scattered, the quantum dot material just has good scattering characteristics. Therefore, the quantum dots are used to fabricate the filters on the color filter substrate, thus the emitted light can be scattered, thereby increasing viewing angles of the display device.

In some embodiments, as shown in FIGS. 5a-5e, in each pixel region 106, the light blocking portion 107 includes at least one strip-shaped light blocking element (as shown by the black rectangle in FIGS. 5a-5e). The filter 108' is directly adjacent to the strip-shaped light blocking element. In FIGS. 5a-5e, white dashed boxes indicate positions of the light extraction elements corresponding to the respective strip-shaped light blocking elements.

Figure 6:
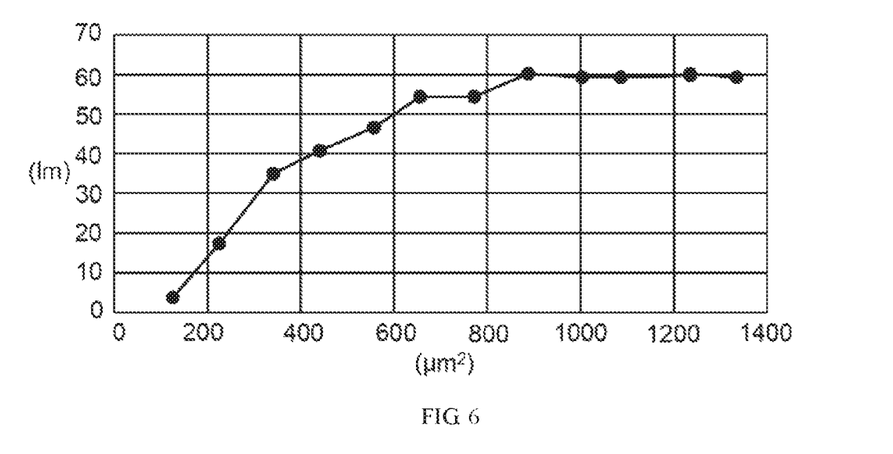
FIG. 6 is a schematic structural diagram of a display panel according to another embodiment of the present disclosure.

With the above arrangement, the light utilization efficiency is further improved while achieving a color display. FIG. 6 shows a curve of the amount of light emitted from a pixel structure according to an example in which the pixel structure is in the form shown in FIG. 5b. In FIG. 6, the abscissa represents the area of the light extraction element, and the ordinate represents the amount of light emitted.

In some embodiments, as shown in FIGS. 2 and 5a-5e, each of the pixel regions 106 further includes a second light transmitting portion 115. In each of the pixel regions 106, a sum of an area of the light blocking portion 107 and an area of the first light transmitting portion 108 is equal to or smaller than an area of the second light transmitting portion 115.

With the above arrangement, light from a side of the light guide plate 101 facing away from the liquid crystal layer, such as but not limited to ambient light, may pass through the liquid crystal layer and emit from the second light transmitting portion 115, thereby achieving a transparent display.

The present disclosure further provides a display device including the above display panel.

In an embodiment of the present disclosure, the display device may be any product or component having a display function, such as a mobile phone, a tablet computer, a television, a display, a notebook computer, a digital photo frame, a navigator, and the like.

According to still another aspect of the present disclosure, an electronic apparatus is provided. The electronic apparatus includes the display device as described in the above embodiments.

Figure 7:
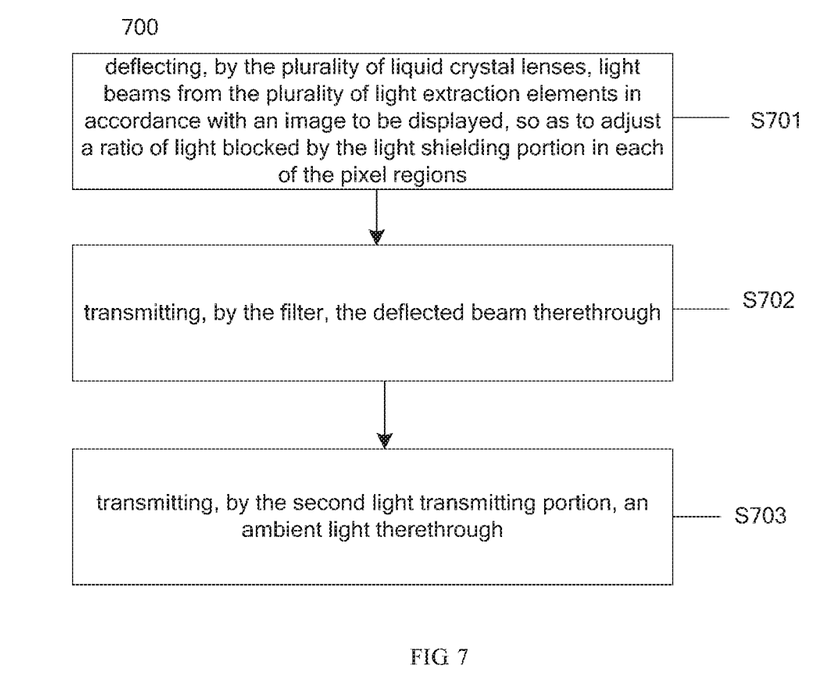
FIG. 7 is a schematic structural diagram of a display panel according to yet another embodiment of the present disclosure.

According to another aspect of the present disclosure, a display method by using the display device as described in the above embodiments is provided. As shown in FIG. 7, the display method 700 includes a step of: S701, deflecting, by the plurality of liquid crystal lenses, light beams from the plurality of light extraction elements in accordance with an image to be displayed, so as to adjust a ratio of light blocked by the light blocking portion in each of the pixel regions.

In some embodiments, each of the pixel regions includes a filter, an orthographic projection of the filter on the light guide plate overlapping with that of the first light transmitting portion on the light guide plate, the method further including a step of: S702, transmitting, by the filter, the deflected beam therethrough (as shown in FIG. 7).

In some embodiments, the liquid crystal lens includes a first electrode, a second electrode and a liquid crystal layer provided between the first electrode and the second electrode, the method further includes a step of: applying a voltage across the first electrode and the second electrode to generate an electric field therebetween, liquid crystal molecules of the liquid crystal layer deflect under the action of the electric field, thus a refractive index of the liquid crystal layer is changed, so that light beam passing therethrough is deflected.

In some embodiments, each of the pixel regions further includes a second light transmitting portion, in each of the pixel regions, a sum of an area of the light blocking portion and an area of the first light transmitting portion is equal to or smaller than an area of the second light transmitting portion, the method further includes a step of: S703, transmitting, by the second light transmitting portion, an ambient light therethrough (as shown in FIG. 7).

Figure 8:
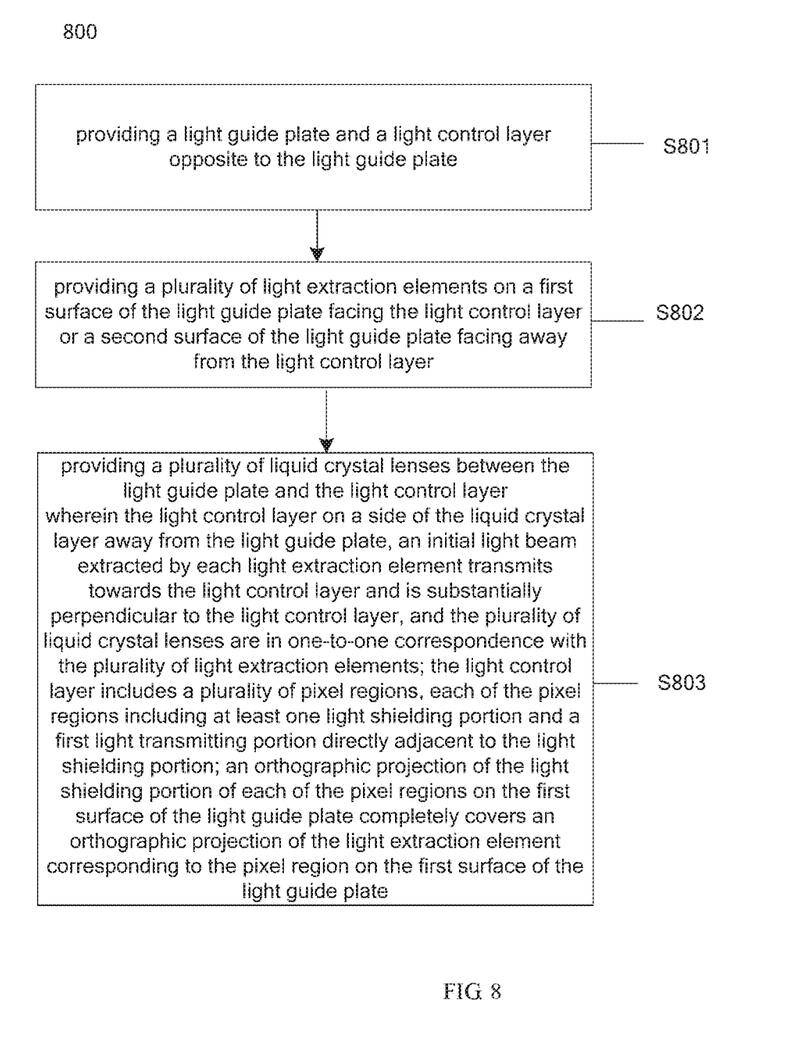
FIG. 8 is a flow chart of a method for fabricating a display panel according to an embodiment of the present disclosure.

According to another aspect of the present disclosure, a method for fabricating a display device is provided. As shown in FIG. 1a, FIG. 2 and FIG. 8, the method 800 for fabricating the display device includes steps of: S801, providing a light guide plate and a light control layer opposite to the light guide plate: S802, providing a plurality of light extraction elements on a first surface of the light guide plate facing the light control layer or a second surface of the light guide plate facing away from the light control layer; S803, providing a plurality of liquid crystal lenses between the light guide plate and the light control layer, wherein the light control layer on a side of the liquid crystal layer away from the light guide plate, an initial light beam extracted by each light extraction element is transmitted toward the light control layer and is substantially perpendicular to the light control layer, and the plurality of liquid crystal lenses are in one-to-one correspondence with the plurality of light extraction elements; the light control layer includes a plurality of pixel regions, each of the pixel regions at least includes a light blocking portion and a first light transmitting portion directly adjacent to the light blocking portion; an orthographic projection of the light blocking portion of each of the pixel regions on the first surface of the light guide plate completely covers an orthographic projection of the light extraction element corresponding to the pixel region on the first surface of the light guide plate.

In an embodiment of the present disclosure, the light extraction element 104 extracts light from the light guide plate 101, the extracted light is transmitted to the liquid crystal layer 102 in a direction substantially perpendicularly to the light guide plate. The orthographic projection of the light blocking portion 107 of each pixel region 106 on the first surface 105 completely covers the orthographic projection of the light extraction element 104 corresponding to the pixel region 106 on the first surface 105. With a liquid crystal lens 112, the light extracted by the light extraction element 104 can be blocked by the light blocking portion 107 (as indicated by the solid arrow in FIG. 1a) or emitted from the first light transmitting portion 108 (as indicated by the dashed arrow in FIG. 1a). In other words, the liquid crystal lens 112 can cause the extracted light to be approximately collimated and emitted toward the light blocking portion 107, so that extracted light is blocked by the light blocking portion 107 to display a dark state, alternatively, the liquid crystal lens 112 can cause the extracted light to be refracted to be emitted from the first light transmitting portion 108 to display an image. Thereby, an image is displayed by the refraction of the liquid crystal lens without providing a polarizer. In the liquid crystal display panel of the related art, two polarizers are used, which is not only costly, but also has a low light transmittance after the incident light passes through the two polarizers. In contrast, the display panel in the embodiment of the present disclosure can increase the light transmittance by about 3 times and the light transmittance of the display panel is improved.

The plurality of light extraction elements 104 may be provided on the first surface 105 of the light guide plate 101 facing the light control layer 103 or the second surface 105' of the light guide plate 101 facing away from the light control layer 103. In a case where the plurality of light extraction elements 104 are provided on the first surface 105, the light extraction elements 104 may be, for example, transmissive gratings. In a case where the plurality of light extraction elements 104 are provided on the second surface 105', the light extraction elements 104 may be, for example, reflective gratings.

In some embodiments, the light extraction element 104 is an echelon grating (as shown in FIG. 3) or a blazed grating (as shown in FIG. 4).

With the echelon grating or the blazed grating, the light extraction efficiency can be further improved, thereby further improving the light utilization efficiency of the display device.

In some embodiments, as shown in FIG. 1a, the display panel 100 further includes a filling layer 109 covering the plurality of light extraction elements 104.

The first surface may be planarized by providing the filling layer, which not only facilitates the extraction of light, but also facilitates bonding of other layers. In addition, a thickness of the filling layer may be greater than or equal to 1 μm, so that the total reflection angle in the light guide plate is large, which is advantageous for light extraction.

In some embodiments, the filling layer 109 has a refractive index lower than a refractive index of the light guide plate 101.

In a case where the refractive index of the filling layer is smaller than the refractive index of the light guide plate, more light may be emitted through the light extraction element, thereby further improving light extraction efficiency.

In some embodiments, as shown in FIG. 1a and FIG. 1b, each of sides of the light guide plate is provided with a light source 110 and a reflector 11, the reflector 111 at least includes a reflective curved surface for redirecting light emitted from the light source 110 to a light incident surface of the light guide plate 101. A distance H between the light emitting surface of the light source 110 and a plane in which the first surface 105 is located in a direction perpendicular to the first surface ranges from 2 mm to 6 mm.

In some embodiments, the light guide plate used has a thickness of about 0.7 mm. The light source has a light emitting direction that is substantially the same as a direction of propagation of the initial light beam. With the above arrangement, the overall thickness and volume of the display device are reduced. Also, more light emitted by the light source can enter the light guide plate, thereby increasing the brightness and contrast of the display device.

In some embodiments, as shown in FIG. 2, each pixel region 106 includes a filter 108', an orthographic projection of the filter 108' on the light guide plate overlaps with that of the first light transmitting portion 108 on the light guide plate.

In some embodiments, as shown in FIG. 2, the filter 108' includes at least three sub-filters of different colors.

With the above-described filter, a color display can be realized.

The filter 108' is made of a quantum dot material.

The light source may be a monochromatic short-wavelength light source, thereby exciting the RGB quantum dot to achieve a color display. In an embodiment of the present disclosure, light extracted by the light extraction element has a certain directivity, so it is required to be scattered, the quantum dot just has good scattering characteristics. Therefore, the quantum dot is used to fabricate the filters on the color filter substrate, the emitted light can be scattered, thereby increasing viewing angles of the display device.

In some embodiments, as shown in FIGS. 5a-5e, in each pixel region 106, the light blocking portion 107 includes at least one strip-shaped light blocking element (as shown by the black rectangle in FIGS. 5a-5e). The filter 108' is directly adjacent to the strip-shaped light blocking element. In FIGS. 5a-5e, white dashed boxes indicate positions of the light extraction elements corresponding to the respective strip-shaped light blocking elements.

With the above arrangement, the light utilization efficiency is further improved while achieving a color display. FIG. 6 shows a curve of the amount of light emitted from a pixel structure according to an example in which the pixel structure is in the form shown in FIG. 5b. In FIG. 6, the abscissa represents the area of the light extraction element, and the ordinate represents the amount of light emitted.

In some embodiments, as shown in FIGS. 2 and 5a-5e, each of the pixel regions 106 further includes a second light transmitting portion 115. In each of the pixel regions 106, a sum of an area of the light blocking portion 107 and an area of the first light transmitting portion 108 is equal to or smaller than an area of the second light transmitting portion 115.

With the above arrangement, light from a side of the light guide plate 101 facing away from the liquid crystal layer, such as but not limited to ambient light, may pass through the liquid crystal layer and emit from the second light transmitting portion 115, thereby achieving a transparent display.

In the display panel, the display device, the electronic apparatus and the display method provided in embodiments of the present disclosure, the light extraction element 104 extracts light from the light guide plate 101, the extracted light is transmitted to the liquid crystal layer 102 in a direction substantially perpendicularly to the light guide plate. The orthographic projection of the light blocking portion 107 of each pixel region 106 on the first surface 105 completely covers the orthographic projection of the light extraction element 104 corresponding to the pixel region 106 on the first surface 105. With the liquid crystal lens 112, the light extracted by the light extraction element 104 can be blocked by the light blocking portion 107 (as indicated by the solid arrow in FIG. 1a) or emitted from the first light transmitting portion 108 (as indicated by the dashed arrow in FIG. 1a). In other words, the liquid crystal lens 112 can cause the extracted light to be approximately collimated and emitted toward the light blocking portion 107, so that extracted light is blocked by the light blocking portion 107 to display a dark state, alternatively, the liquid crystal lens 112 can cause the extracted light to be refracted to be emitted from the first light transmitting portion 108 to display an image. Thereby, an image is displayed by the refraction of the liquid crystal lens without providing a polarizer. In the liquid crystal display panel of the related art, two polarizers are used, which is not only costly, but also has a low light transmittance after the incident light passes through the two polarizers. In contrast, the display panel in the embodiment of the present disclosure can increase the light transmittance by about 3 times and the light transmittance of the display panel is improved.

The above description is only for specific embodiments of the present disclosure, but the protection scope of the present disclosure is not limited thereto. Any changes or substitutions that are obvious to those skilled in the art within the technical scope of the present disclosure are intended to fall within the protection scope of the present disclosure. Therefore, the protection scope of the present disclosure should be determined by the protection scope of Claims.

The invention claimed is:

1. A display panel, comprising:
   a light guide plate;
   a plurality of liquid crystal lenses provided in a single layer;
   a light control layer provided in a stacked manner with the light guide plate and the plurality of liquid crystal lenses, wherein the plurality of liquid crystal lenses are provided between the light guide plate and the light control layer;
   a plurality of light extraction elements spaced apart from each other and provided on a first surface of the light guide plate facing the light control layer or a second surface of the light guide plate facing away from the light control layer, an initial light beam extracted by each light extraction element is transmitted toward the light control layer and is substantially perpendicular to the light control layer, and the plurality of liquid crystal lenses are in one-to-one correspondence with the plurality of light extraction elements;
   wherein the light control layer includes a plurality of pixel regions, each of the pixel regions at least including a light blocking portion and a first light transmitting portion directly adjacent to the light blocking portion, the light blocking portion and the first transmitting portion are located on a same plane, an orthographic projection of the light blocking portion of each of the pixel regions on the first surface of the light guide plate covers an orthographic projection of the light extraction element corresponding to the pixel region on the first surface of the light guide plate.

2. The display panel of claim 1, wherein the liquid crystal lens comprises a first electrode, a second electrode and a liquid crystal layer, wherein the first electrode and the second electrode are provided above the plurality of light extraction elements, and the liquid crystal layer is provided above the first electrode and second electrode.

3. The display panel of claim 2, wherein the display panel is a liquid crystal display panel, and the first electrode is a pixel electrode and the second electrode is a common electrode.

4. The display panel of claim 1, wherein the light extraction element is an echelon grating or a blazed grating.

5. The display panel of claim 1, further comprising: a filling layer covering the plurality of light extraction elements.

6. The display panel of claim 5, wherein the filling layer has a refractive index lower than a refractive index of the light guide plate.

7. The display panel of claim 1, wherein at least one side of the light guide plate is provided with a light source and a reflector, the reflector comprising at least a reflective curved surface for redirecting light emitted by the light source to a light incident surface of the light guide plate; a distance between a light emitting surface of the light source and a plane in which the first surface being located in a direction perpendicular to the first surface ranges from 2 mm to 6 mm.

8. The display panel of claim 7, wherein both sides of the light guide plate are provided with a light source and a reflector respectively, each reflector comprising the reflective curved surface and a reflective flat surface.

9. The display panel of claim 8, wherein the reflective plane has a width ranging from 1 mm to 4 mm, a distance between a light emitting surface of the light source and a plane in which the first surface is located in a direction perpendicular to the first surface ranges from 2 mm to 4 mm.

10. The display panel of claim 1, wherein each of the pixel regions comprises a filter, an orthographic projection of the filter on the light guide plate overlapping with an orthographic projection of the first light transmitting portion on the light guide plate.

11. The display panel of claim 10, wherein the filter comprises at least three sub-filters of different colors.

12. The display panel of claim 10, wherein the material of the filter is a quantum dot.

13. The display panel of claim 12, wherein in each of the pixel regions, the light blocking portion comprises at least one strip-shaped light blocking element.

14. The display panel of claim 1, wherein each of the pixel regions further comprises a second light transmitting portion; in each of the pixel regions, a sum of an area of the light blocking portion and an area of the first light transmitting portion is equal to or smaller than an area of the second light transmitting portion.

15. A display device, comprising the display panel of claim 1.

16. A display method of the display panel of claim 1, comprising:
   deflecting, by the plurality of liquid crystal lenses, light beams from the plurality of light extraction elements in accordance with an image to be displayed, so as to adjust a ratio of light blocked by the light blocking portion in each of the pixel regions.

17. The display method of claim 16, wherein the liquid crystal lens comprises a first electrode, a second electrode, and a liquid crystal layer provided between the first electrode and the second electrode, the method further comprising:
   applying a voltage across the first electrode and the second electrode to generate an electric field therebetween, liquid crystal molecules of the liquid crystal layer deflect under an action of the electric field, thus a refractive index of the liquid crystal layer is changed, so that light beam passing therethrough is deflected.

18. The display method of claim 16, wherein each of the pixel regions comprises a filter, an orthographic projection of the filter on the light guide plate overlapping with that of the first light transmitting portion on the light guide plate, the method further comprising:
   transmitting, by the filter, the deflected beam therethrough.

19. The display method of claim 16, wherein each of the pixel regions further comprises a second light transmitting portion; in each of the pixel regions, a sum of an area of the light blocking portion and an area of the first light transmitting portion is equal to or smaller than an area of the second light transmitting portion, the method further comprising:

transmitting, by the second light transmitting portion, an ambient light therethrough.

20. A method for fabricating the display substrate of claim 1, comprising:

providing a light guide plate and a light control layer opposite to the light guide plate;

providing a plurality of light extraction elements on a first surface of the light guide plate facing the light control layer or a second surface of the light guide plate facing away from the light control layer, wherein the plurality of light extraction elements are spaced apart from each other;

providing a plurality of liquid crystal lenses between the light guide plate and the light control layer, wherein the light control layer on a side of the liquid crystal layer away from the light guide plate, an initial light beam extracted by each light extraction element is transmitted towards the light control layer and is substantially perpendicular to the light control layer, and the plurality of liquid crystal lenses are in one-to-one correspondence with the plurality of light extraction elements; the light control layer includes a plurality of pixel regions, each of the pixel regions including at least a light blocking portion and a first light transmitting portion directly adjacent to the light blocking portion; the light blocking portion and the first transmitting portion are provided on a same plane, an orthographic projection of the light blocking portion of each of the pixel regions on the first surface of the light guide plate completely covers an orthographic projection of the light extraction element corresponding to the pixel region on the first surface of the light guide plate.

* * * * *